United States Patent Office.

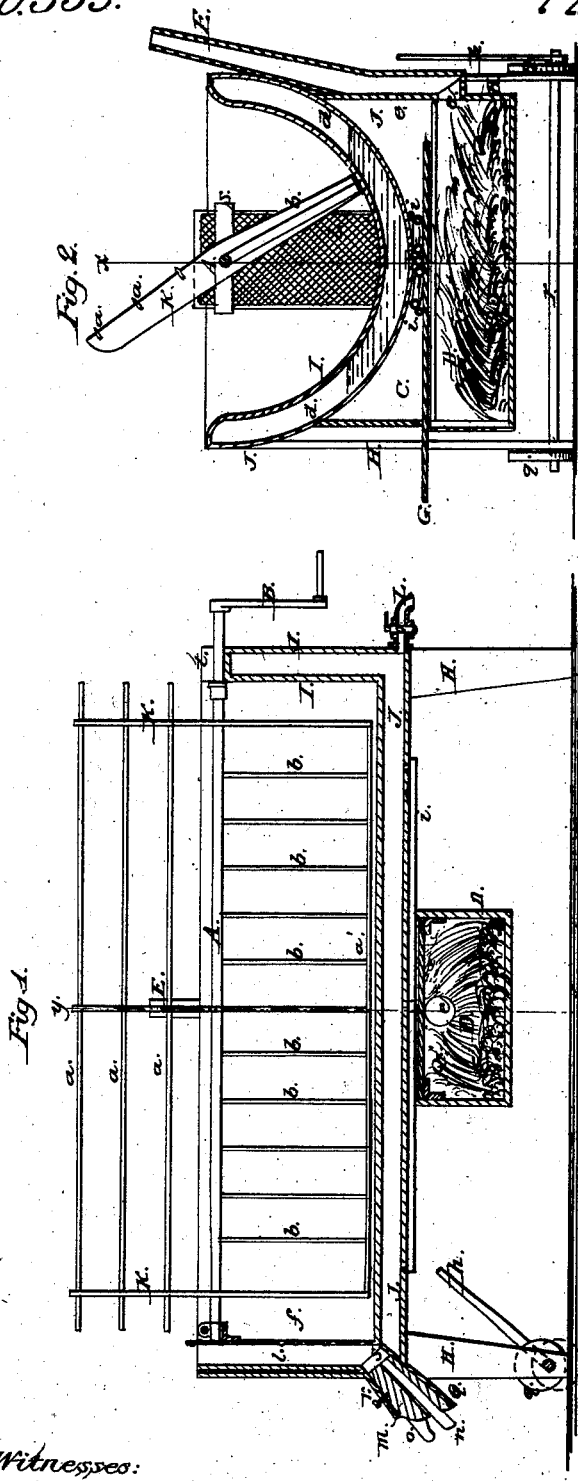

PASCHAL COLVIN, OF PECATONICA, ILLINOIS.

Letters Patent No. 80,335, dated July 28, 1868.

IMPROVEMENT IN CHEESE-VAT.

*The Schedule referred to in these Letters Patent and making part of the same.*

TO ALL WHOM IT MAY CONCERN:

Be it known that I, PASCHAL COLVIN, of Pecatonica, in the State of Illinois, have invented a new and useful Improvement in the Manufacture of Cheese-Vats; and I do hereby declare that the following is a full, clear, and exact description thereof, which will enable others skilled in the art to make and use the same, reference being had to the accompanying drawing, forming part of this specification, in which—

Figure 1 is a longitudinal vertical section of my improved cheese-vat through the line $x\ x$, fig. 2.

Figure 2 is a cross-section of the same, through the line $y\ y$, fig. 1.

Figure 3 is a detail view of the agitator.

Figure 4 is a cross-section of the same.

Figure 5 is a reduced bottom view of the vat, showing the circulating-pipes.

Similar letters of reference indicate like parts.

The object of this invention is to provide an apparatus which will accomplish the formation and manipulation of cheese-curds in an effective and economical manner.

It consists of a semi-cylindrical vat, composed of the shell I J, having a water-space, $d$, as shown.

The vat is supported by legs H H H H, as shown.

Affixed to and underneath the vat, is a furnace, D, of any suitable known form, as that shown. This furnace is provided with a slide-plate, G, sliding in horizontal grooves over the fire-box, as shown, thus serving to shut off the heat from direct contact with the vat, whenever it is necessary to do so, in maintaining the temperature of the water in the vat at a certain degree. This is accomplished by moving the plate wholly or partially from above the fire.

In order to obtain a better diffusion of the heat throughout the water, circulating-pipes $i\ i\ i$ are affixed to the bottom of the outer shell J of the vat, which pipes are coiled in any suitable manner above the furnace, and then branch out toward the ends of the vat, as shown at fig. 5.

These pipes communicate with the water-space between the shells I and J, at the central coils, and also at the ends of the branches, whereby a circulation of heated water is set up, and the whole equably heated from a comparatively small heating-surface.

The cutting-frame is for the purpose of cutting the curd formed in the vat into cakes or blocks of suitable dimensions to facilitate the escape of the whey.

Heretofore the curds were lifted out from the vat, and carried to the cheese-press, but, by means of the semi-cylindrical form of the vat, and the cutting-frame, the curd is separated from the inner surface of the vat, and cut longitudinally and transversely by means of longitudinal cutters $a\ a\ a$, and the transverse cutters $b\ b\ b$, &c., by simply revolving the shaft A in its bearings $t\ t$, whereby the curd will be cut into cakes of suitable size to permit the perfect elimination of the whey, as aforesaid.

The cutters $a\ a\ a\ a$ are affixed to the radial bars K K K, which are equal in length to the radius of the arc of the inner shell I of the vat, whereby the outer longitudinal cutter will pass in contact with said shell, and cleave or separate the adhering curd from the same.

The transverse cutters $b\ b\ b$, &c., are affixed between the shaft A and the longitudinal cutter $a'$, as shown.

B is the crank-handle.

The cutting-frame can be lifted from the vat, as one end of its shaft rests under a pin in one bearing, and in an open bearing at the other, as shown.

The smoke passes off from the furnace through the holes $e\ e'$, to the pipe E.

The plug $m$ of the spout Q is perforated near its lower side, for the purpose of permitting the escape of the whey. A plug, $n$, serves to close this hole or perforation, when it is requisite to do so.

The spout Q opens internally into the vertical semicircular chamber $l$, which latter is provided with a strainer-plate, $f$, which slides in vertical grooves in the end of the inner shell, and is withdrawn vertically, when the curd is to be discharged through the spout, into the hoop of the cheese-press, placed beneath the said spout.